(12) United States Patent
Yoshioka et al.

(10) Patent No.: US 10,784,479 B2
(45) Date of Patent: Sep. 22, 2020

(54) BATTERY FORKLIFT

(71) Applicant: Mitsubishi Logisnext Co., Ltd., Kyoto (JP)

(72) Inventors: Masahiro Yoshioka, Kyoto (JP); Takuya Sano, Kyoto (JP)

(73) Assignee: MITSUBISHI LOGISNEXT CO., LTD., Kyoto (JP)

( * ) Notice: Subject to any disclaimer, the term of this patent is extended or adjusted under 35 U.S.C. 154(b) by 16 days.

(21) Appl. No.: 16/379,994

(22) Filed: Apr. 10, 2019

(65) Prior Publication Data

US 2019/0326568 A1  Oct. 24, 2019

(30) Foreign Application Priority Data

Apr. 18, 2018  (JP) .................. 2018-079700

(51) Int. Cl.
*H01M 4/02* (2006.01)
*H01M 2/10* (2006.01)
*B66F 9/18* (2006.01)
*H01M 10/48* (2006.01)

(52) U.S. Cl.
CPC ............. *H01M 2/1072* (2013.01); *B66F 9/18* (2013.01); *H01M 10/48* (2013.01); *H01M 2220/20* (2013.01)

(58) Field of Classification Search
CPC ..................................................... H01M 4/02
See application file for complete search history.

(56) References Cited

U.S. PATENT DOCUMENTS

2005/0255377 A1*  11/2005  Kondo .................... B60K 1/04
                                                            429/100

FOREIGN PATENT DOCUMENTS

| JP | S57-37017    | 2/1982  |
| JP | H04-067562   | 3/1992  |
| JP | 2005132584   | 5/2005  |
| JP | 2005324643   | 11/2005 |
| JP | 2008-297106  | 12/2008 |

* cited by examiner

*Primary Examiner* — Jacob B Marks
(74) *Attorney, Agent, or Firm* — Kirschstein, Israel, Schiffmiller & Pieroni, P.C.

(57) ABSTRACT

A battery lock device for a forklift includes a lock plate capable of moving between a first position and a second position. The lock plate at the first position is configured to keep a battery from being protruded. The lock plate at the second position is configured to enable the battery to be protruded. The battery lock device includes a shaft configured to rotatably support the lock plate with respect to a body, a fixed portion opposed to the lock plate, a lock pin capable of sliding toward the fixed portion in a first direction and away from the fixed portion in a second direction, and a spring configured to press the lock pin in the first direction. First and second holes are provided in the fixed portion. The lock pin is inserted into the first and second holes.

3 Claims, 4 Drawing Sheets

BATTERY FORKLIFT

TECHNICAL FIELD OF THE INVENTION

The present invention relates to a battery forklift comprising a battery lock device that keeps a battery from being protruded.

BACKGROUND OF THE INVENTION

A battery forklift includes a battery accommodated in a battery housing so as to run and drive. The battery forklift includes a battery lock device that keeps the battery from being protruded out of the battery housing when the battery forklift runs.

The battery lock device described in Patent Document 1 is configured as follows, see FIGS. 1 to 3 of Patent Document 1 regarding Reference Numbers. The battery lock device includes a stopper 30 disposed at an entrance of a battery case 20, a stopper holder 40 that rotatably holds the stopper 30, and a lock portion 50 that locks the rotation of the stopper 30.

The lock portion 50 includes a lock pin holder 51, a lock pin 53 inserted in the lock pin holder 51 and movable upwardly and downwardly, and a notch portion 57 formed in the lock pin holder 51. The lock pin 53 includes a lower end portion 54 engaged with a pin hole 37 formed in the stopper 30, a lever 58 provided at its upper end, a pin 59 engageable with the notch portion 57, and a coil spring 56 that presses the lock pin 53 downwardly.

An operator needs to move the lock pin 53 upwardly and downwardly and to rotate it in an arrow direction B so as to engage and release the pin 59 with the notch portion 57 when the operator switches between the stopper 30 rotating or not by using the lock portion 50. Therefore, the battery lock device described in Patent Document 1 needs a complicated operation.

The battery lock device described in Patent Document 2 is configured as follows see FIGS. 4 to 6 of Patent Document 2 regarding Reference Numbers. The battery lock device includes open-close plates 22R, 22L movable between standing and lodging positions, an open lock tool 28 configured to lock the open-close plates 22R, 22L in the standing position, and a close lock tool 29 configured to lock the open-close plates 22R, 22L in the lodging position.

The open lock tool 28 can lock the open-close plates 22R and 22L in the standing position by attaching a lock pin 28d into a pin hole. The close lock tool 29 can lock the open-close plates 22R and 22L in the lodging position by operating a lock bar 29a retractably and rotatably.

An operator needs to operate both the open-close lock tools 28 and 29 when switching the open-close plates 22R and 22L between the standing and lodging positions. Therefore, the battery lock device described in Patent Document 2 needs a complicated operation.

Patent Document 1: JP04-67562
Patent Document 2: JP 2008-297106

SUMMARY

Problems to be Solved by the Invention

It is an object of the present invention to provide a battery forklift that includes a battery lock device that does not need a complicated operation.

Solution to the Problems

In order to achieve the objects, the present invention provides a battery forklift, comprising:

a battery housing formed in a body and configured to accommodate a battery; and
a battery lock device configured to keep the battery from being protruded out of the battery housing, wherein
the battery lock device comprises:
a lock plate capable of moving between first and second positions, the lock plate disposed at the first position configured to keep the battery from being protruded, the lock plate disposed at the second position configured to enable the battery to be protruded;
a shaft configured to rotatably support the lock plate with respect to the body;
a fixed portion fixed on the body and opposed to the lock plate;
a lock pin capable of sliding toward the fixed portion in a first direction and away from the fixed portion in a second direction;
a spring configured to press the lock pin in the first direction; and
first and second holes provided in the fixed portion, the lock pin being inserted into the first and second holes; and wherein
the lock plate is locked at the first position when the lock plate is inserted into the first hole,
the lock plate is locked at the second position when the lock plate is inserted into the second hole, and
the lock plate is moved between the first and second positions when the lock pin is withdrawn from the first and second holes.

According to a preferred embodiment of the present invention, wherein the lock plate is extended in a horizontal direction when being disposed at the first position, and the lock plate is extended in a vertical direction when being disposed at the second position.

According to a preferred embodiment of the present invention, wherein the battery lock device comprises: a protrusion mounted on the lock plate; and a notch portion provided in the body and capable of engaging with the protrusion, and wherein the protrusion is engaged with the notch portion when the lock plate is locked at the first position.

According to a preferred embodiment of the present invention, wherein the lock plate comprises: a first end portion supported by the shaft; and a second end portion opposed to the first end portion, and wherein the protrusion is provided at least at the second end portion.

According to a preferred embodiment of the present invention, wherein the battery lock device comprises a sensor configured to detect whether the lock plate is disposed at the first position, and the battery forklift comprises an alarm portion configured to alarm a driver when the sensor detects that the lock plate is not disposed at the first position.

According to a preferred embodiment of the present invention, wherein the lock pin has a semispherical shape at an edge thereof.

Effect of the Invention

The battery forklift according to the present invention includes the battery lock device that does not need a complicated operation.

DETAILED EXPLANATION OF THE PREFERRED EMBODIMENTS

A battery forklift (hereinafter, referred to as a "forklift") according to the present invention will be explained below with reference to the drawings. A left-right direction X, a front-back direction Y and an up-down direction Z are arranged at approximately right angle to each other. The left-right direction and the front-back direction Y are extended horizontally. The up-down direction Z is extended vertically.

Figure 1:
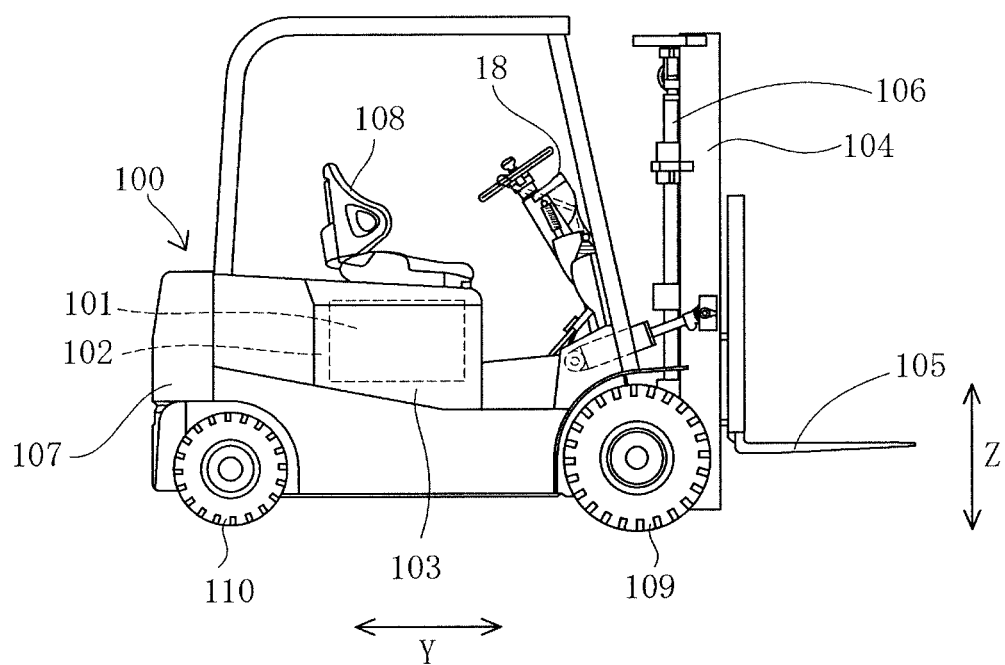
FIG. 1 is a side view showing the battery forklift according to the present invention.

As shown in FIG. 1, the forklift includes a body 100 composed of frames. The forklift, at the front area of the body 100, has masts 104 extended in the up-down direction Z, forks 105 slidable along the masts 104 for loading and unloading, and a lift cylinder 106 that is expanded and contracted by hydraulic oil supplied from a hydraulic device so as to move the forks 105 upwardly and downwardly.

The forklift, at the rear area of the body 100, has a counter weight 107 for balancing the body 100 when loading and unloading with the forks 105. The forklift further includes a controller (not shown) configured to control the drive device, the hydraulic device, a driver seat 108, front wheels 109 and rear wheels 110 and so on.

Figure 2:
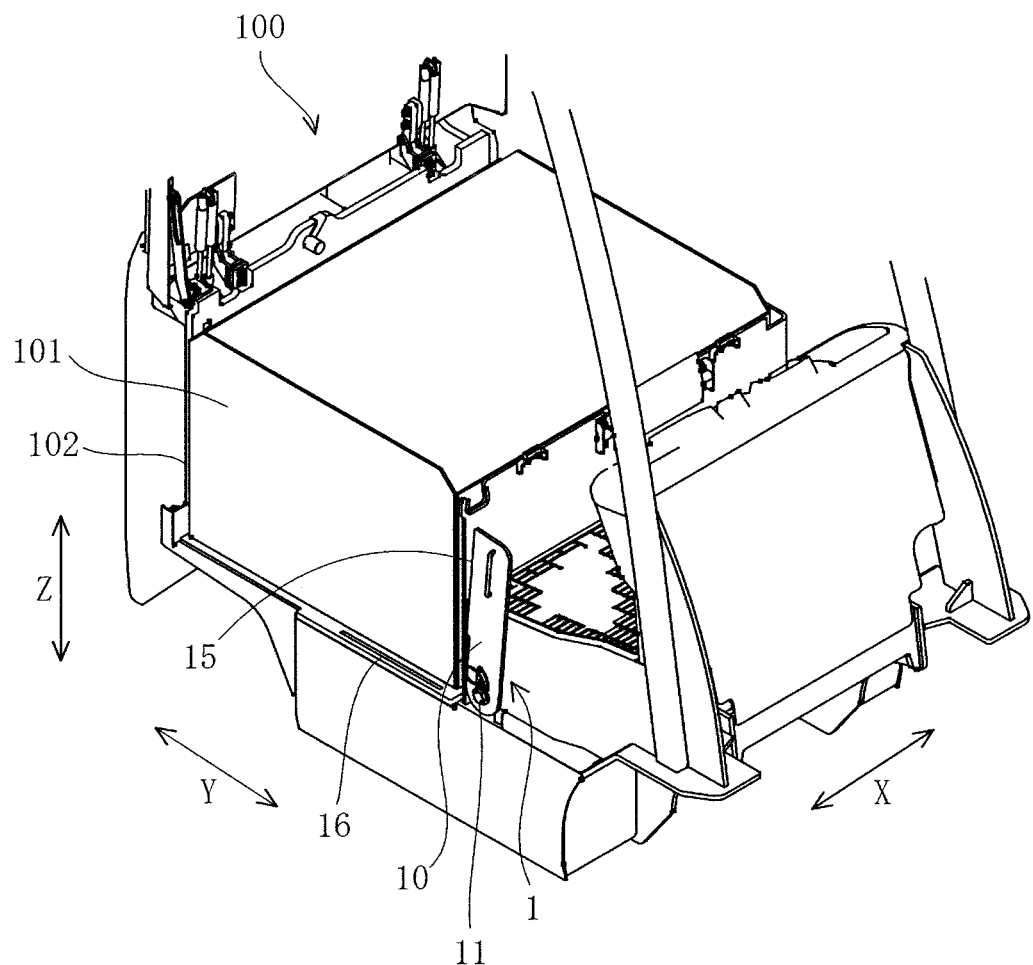
FIG. 2 is a perspective view showing an internal structure of a body.

As shown in FIG. 2, the battery forklift includes a battery housing 102 formed in the body 100. The battery housing 102 is configured to accommodate or house a battery 101. The forklift includes a cover 103 configured to open and close the battery housing 102 (FIG. 1). The forklift can drive the drive and hydraulic devices by using the battery 101 as a drive source.

The battery 101 can be moved into and out of the battery housing 102 in the left-right direction X. The forklift includes a battery lock device 1 that keeps the battery 101 from being protruded out of the battery housing 102. The battery lock device 1 keeps the battery 101 from being protruded out of the battery housing 102 while the forklift runs.

Figure 3:
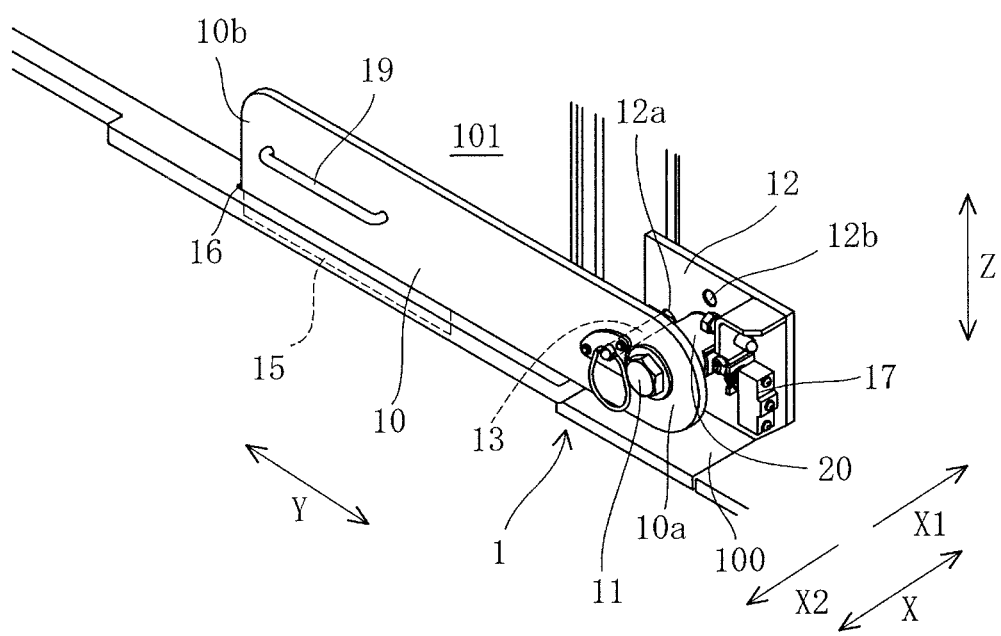
FIG. 3 is a perspective view showing a battery lock device.

As shown in FIGS. 2 and 3, the battery lock device 1 includes a lock plate 10. The lock plate 10 can be moved between the first position (FIG. 3) and the second position (FIG. 2). The lock plate 10 disposed at the first position prevents the battery 101 from being protruded, while the lock plate 10 disposed at the second position allows the battery 101 to be protruded. The lock plate 10 is extended in a horizontal direction (the front-back direction Y) when being locked at the first position (FIG. 3), while the lock plate 10 is extended in a vertical direction (the up-down direction Z) when being locked at the second position (FIG. 2).

The lock plate 10 can cover the opening portion of the battery housing 102 when being disposed at the first position (FIG. 3) so as to keep the battery 101 from moving out of the battery housing 102 in the left-right direction X. The lock plate 10 cannot cover the opening portion of the battery housing 102 when being disposed at the second position (FIG. 2) so as not to keep the battery 101 from moving out of the battery housing 102 in the left-right direction X.

Figure 4:
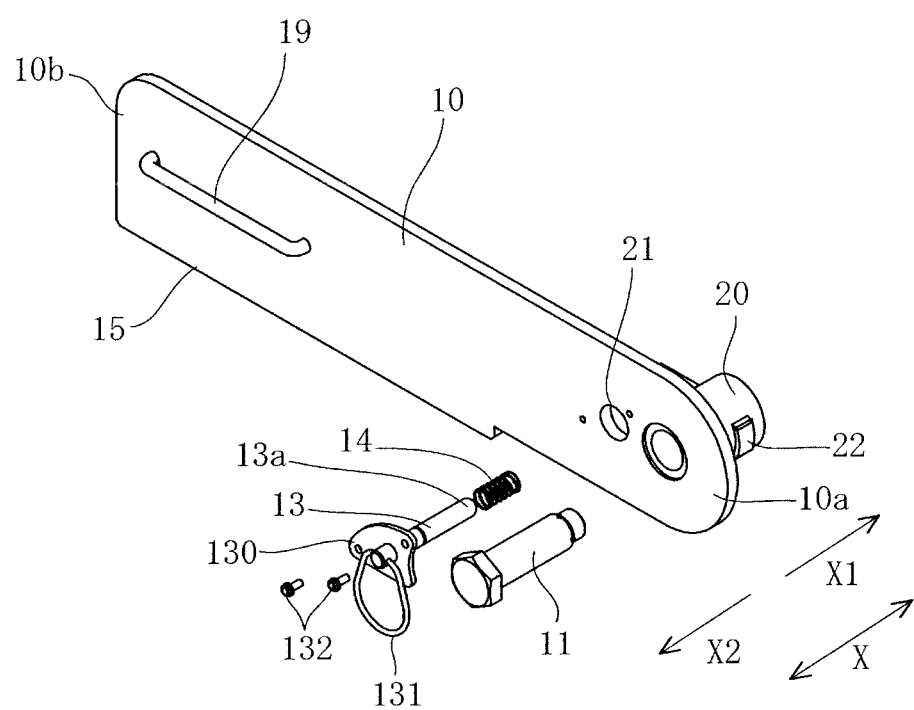
FIG. 4 is an exploded perspective view showing the battery lock device.

As shown in FIG. 3, the battery lock device 1 includes a shaft 11 configured to rotatably support the lock plate 10 on the body 100. As shown in FIG. 4, the lock plate 10 includes a bearing 20 near the first end portion 10a. The shaft 11 is inserted into the bearing 20. As shown in FIG. 3, the battery lock device 1 includes a fixed portion 12 opposed to the lock plate 10. The fixed portion 12 is fixed on the body 100. The shaft 11 is fixed on the fixed portion 12. The lock plate 10 can rotate with respect to the fixed portion 12 about the shaft 11 and between the first position (FIG. 3) and the second position (FIG. 2).

As shown in FIGS. 3 and 4, the battery lock device 1 includes a lock pin 13. The lock pin 13 is inserted into a through hole 21 provided in the lock plate 10. The lock pin 13 is slidable in the left-right direction X so as to move toward the fixed portion 12 in the first direction X1 and away from the fixed portion 12 in the second direction X2. The edge 13a of the lock pin 13 is opposed to the fixed portion 12. The lock pin 13 has a ring portion 131 on opposite side to the ring portion 131. An operator can slide the lock pin 13 in the second direction X2 using the ring portion 131.

The lock pin 13 is inserted into a base portion 130 disposed near the ring portion 131. The base portion 130 is connected with the lock plate 10 via bolts 132. The battery lock device 1 includes a spring 14 disposed between the base portion 130 and the lock pin 13. The spring 14 is configured to press the lock pin 13 in the first direction X1. Therefore, the lock pin 13 is constantly pressed by the spring 14 in the first direction X1.

As shown in FIG. 3, first and second holes 12a, 12b are provided in the fixed portion 12, through which the edge 13a of the lock pin 13 can be inserted. The lock pin 13 is inserted into the first hole 12a so as to prevent the rotation of the lock plate 10 in such a manner that the lock plate 10 is locked at the first position (FIG. 3). The lock pin 13 is inserted into the second hole 12b so as to prevent the rotation of the lock plate 10 in such a manner that the lock plate 10 is locked at the second position (FIG. 2). The lock pin 13 is withdrawn from the first and second holes 12a, 12b in such a manner that the lock plate 10 can move between the first position (FIG. 3) and the second position (FIG. 2). The lock plate 10 has a handle portion 19 so that an operator can easily rotate the lock plate 10.

When moving the lock plate 10 between the first position (FIG. 3) and the in second position (FIG. 2), an operator can grip the ring portion 131 and pull the lock pin 13 in the second direction X2 against the press force of the spring 14 so as to withdraw the lock pin 13 from the first and second holes 12a, 12b. The operator can rotate the lock plate 10 and release the ring portion 131 after withdrawing the lock pin 13 from the first and second holes 12a and 12b so that the edge 13a of the lock pin 13 is brought into contact with the surface of the fixed portion 12 by the press force of the spring 14.

The operator rotates the lock plate 10 to the first position (FIG. 3) or the second position (FIG. 2) in which the edge 13a of the lock pin 13 contacts with the surface of the fixed portion 12 in such a manner that the lock pin 13 can be inserted into the first hole 12a or the second hole 12b by the press force of the spring 14. As shown in FIG. 4, the edge 13a of the lock pin 13 has a semispherical shape so as to smoothly insert into the first or second hole 12a, 12b while moving.

As shown in FIGS. 2 and 3, the battery lock device 1 includes a protrusion 15 mounted on the lock plate 10. The battery lock device 1 includes a notch portion 16 engageable with the protrusion 15. The notch portion 16 is provided in the body 100. As shown in FIG. 3, the protrusion 15 is engaged with the notch portion 16 so that the lock plate 10 at the first position can be strongly coupled to the lock plate 10 when the lock plate 10 is disposed at the first position (FIG. 3).

The lock plate 10 includes the first end portion 10a including the shaft 11, and the second end portion 10b opposed to the first end portion 10a. Particularly, the lock plate 10 may be folded when the battery 101 abuts against the lock plate 10 because the second end portion 10b of the lock plate 10 is a free end. Therefore, the protrusion 15 is extended from the second end portion 10b to the first end portion 10a and provided at least at the second end portion 10b. The free end of the lock plate 10 is engaged with the body 100 so as to prevent the lock plate 10 from being folded by engaging the protrusion 15 with the notch portion 16.

As shown in FIG. 3, the battery lock device 1 includes a sensor 17 that detects whether the lock plate 10 is disposed on the first position (FIG. 3) or not. The sensor 17 is composed of a contact sensor et al. so as to detect that the lock plate 10 is disposed at the second position when contacting with a cam 22 which is mounted on the bearing 20 and rotates along with the lock plate 10.

As shown in FIG. 1, the forklift includes an alarm portion 18. The alarm portion 18 can alarm the driver when the sensor 17 detects that the lock plate 10 is not disposed at the first position (FIG. 3), so that the body is controlled so as not to be driven. Therefore, it is possible to keep the driver from driving the forklift when the battery lock device 1 does not prevent the protruding of the battery 101.

The above-described embodiment is merely one preferable embodiment of the present invention, and the structure of the present invention is not limited to this embodiment.

The effect of the invention will be explained below.

In the battery lock device 1 according to the invention, an operator can move the lock plate 10 by sliding the lock pin 13 and can automatically lock the lock plate 10 by the press force of the spring 14. Therefore, the operator does not need a complicated operation.

When changing the battery 101, an operator disposes a platform cart adjacent to the forklift so as to move the battery 101 toward or out of the platform cart. At the time, the lock plate 10 is less likely to collide against the platform cart or the battery 101 because the lock plate 10 is extended vertically (in the up-down direction Z) when being disposed at the second position (FIG. 4).

When the lock plate 10 is disposed at the first position (FIG. 3), the protrusion 15 is engaged with the notch position 16 so that the lock plate 10 disposed at the first position can be strongly connected with body 100.

The protrusion 15 is extended from the second end portion 10b thereof to the first end portion 10a thereof, and provided at least at the second end portion 10b. Therefore, the free end of the lock plate 10 can be engaged with the body 100 so as to prevent the lock plate 10 from being folded.

The alarm portion 18 alarms a driver when the sensor 17 detects that the lock plate 10 is not disposed at the first position (FIG. 3). Therefore, it is possible to keep the driver from driving the forklift when the battery lock device 1 does not prevent the protruding of the battery 101.

The edge 13a of the lock pin 13 has a semispherical shape so as to smoothly insert into the first and second holes 12a, 12b while moving.

The lock pin 13 inserts into the first or second hole 12a, 12b so that an operator can easily recognize that the movement of the lock plate 10 to the first or second hole 12a, 12b is completed.

DESCRIPTION OF REFERENCE NUMBERS

1: battery lock device
10: lock plate
10a: first end portion of lock plate
10b: second end portion of lock plate
11: shaft
12: fixed portion
12a: first hole
12b: second hole
13: lock pin
13a: edge of lock pin
14: spring
15: protrusion
16: notch portion
17: sensor
18: alarm portion
100: body
101: battery
102: battery housing
X: left-right direction (horizontal direction)
Y: front-back direction (horizontal direction)
Z: up-down direction (vertical direction)

What is claimed is:

1. A battery forklift, comprising:
a battery housing formed in a body and configured to accommodate a battery; and
a battery lock device configured to keep the battery from being protruded out of the battery housing, wherein the battery lock device comprises:
a lock plate capable of moving between first and second positions, the lock plate disposed at the first position to keep the battery from being protruded, the lock plate disposed at the second position to enable the battery to be protruded;
a shaft configured to rotatably support the lock plate with respect to the body;
a fixed portion fixed on the body and opposed to the lock plate;
a lock pin capable of sliding toward the fixed portion in a first direction and away from the fixed portion in a second direction;
a spring configured to press the lock pin in the first direction; and
first and second holes provided in the fixed portion, the lock pin being selectively inserted into any one of the first and second holes; and wherein
the lock plate is locked at the first position when the lock pin is inserted into the first hole,
the lock plate is locked at the second position when the lock pin is inserted into the second hole, and wherein
the lock plate is moved between the first and second positions when the lock pin is withdrawn from the first and second holes, and the lock plate is extended in a horizontal direction when being disposed at the first position and in a vertical direction when being disposed at the second position, and wherein
the battery lock device comprises:
a protrusion mounted on the lock plate; and
a notch portion provided in the body and capable of engaging with the protrusion, and wherein the protrusion is engaged with the notch portion when the lock plate is locked at the first position.

2. The battery forklift according to claim 1, wherein the lock plate comprises:
a first end portion supported by the shaft; and
a second end portion opposed to the first end portion, and wherein
the protrusion is provided at least at the second end portion.

3. The battery forklift according to claim 1, wherein
the battery lock device comprises a sensor configured to detect whether the lock plate is disposed at the first position, and
the battery forklift comprises an alarm portion configured to alarm a driver when the sensor detects that the lock plate is not disposed at the first position.

* * * * *